United States Patent
Rosenburg

(12) 
(10) Patent No.: US 6,173,580 B1
(45) Date of Patent: Jan. 16, 2001

(54) REFRIGERATOR CRISPER DRAWER LINER FOR PREVENTING THE SPOILAGE OF PRODUCE STORED IN A REFRIGERATOR DRAWER

(76) Inventor: Max Rosenburg, 4224 Houmb Blvd. Suite 548, Metairie, LA (US) 70008

( * ) Notice: Under 35 U.S.C. 154(b), the term of this patent shall be extended for 0 days.

(21) Appl. No.: 09/296,259

(22) Filed: Apr. 22, 1999

(51) Int. Cl.⁷ ..................................................... F25D 17/04
(52) U.S. Cl. .................. 62/407; 62/465; 62/371
(58) Field of Search ............................... 62/407, 465, 371

(56) References Cited

U.S. PATENT DOCUMENTS

| | | |
|---|---|---|
| Re. 33,143 | 1/1990 | Grone . |
| D. 272,222 | 1/1984 | Cho . |
| D. 286,496 | 11/1986 | Daenen et al. . |
| D. 286,497 | 11/1986 | Daenen et al. . |
| D. 332,204 | 1/1993 | Carlson . |
| D. 384,681 | 10/1997 | Martin . |
| 2,867,096 * | 1/1959 | Rosebrook et al. .................. 62/407 |
| 3,006,166 * | 10/1961 | Kronenberger et al. .............. 62/407 |
| 3,251,639 | 5/1966 | Silowash . |
| 3,424,594 | 1/1969 | Tolmon . |
| 3,698,783 | 10/1972 | Swett et al. . |
| 3,756,681 | 9/1973 | Croston . |
| 3,915,532 | 10/1975 | Ashton . |
| 3,998,069 | 12/1976 | Kronenberger et al. . |
| 4,144,671 | 3/1979 | Lee . |
| 4,169,638 | 10/1979 | Cirasuolo et al. . |
| 4,173,378 | 11/1979 | Hanson et al. . |
| 4,505,131 * | 3/1985 | Boxall .................................. 62/407 |
| 4,580,852 | 4/1986 | Smitte et al. . |
| 4,609,237 | 9/1986 | Daenen et al. . |
| 4,702,377 | 10/1987 | Grone . |
| 4,728,762 | 3/1988 | Roth et al. . |
| 4,729,613 * | 3/1988 | Tromble et al. .................... 312/270 |
| 4,898,273 | 2/1990 | Kristiansen . |
| 5,006,684 | 4/1991 | Wendt et al. . |
| 5,044,704 | 9/1991 | Bussan et al. . |
| 5,212,962 | 5/1993 | Kang et al. . |
| 5,417,080 | 5/1995 | Bishop . |
| 5,492,705 | 2/1996 | Porchia et al. . |
| 5,655,708 | 8/1997 | Grone . |
| 5,704,485 * | 1/1998 | Cautereels et al. .................. 206/546 |
| 5,729,997 * | 3/1998 | Witsoe ................................. 62/407 |
| 5,749,866 | 5/1998 | Roe et al. . |
| 5,816,488 | 10/1998 | Moeder . |

FOREIGN PATENT DOCUMENTS 0 505 171    9/1992   (EP) .

* cited by examiner

Primary Examiner—William Doerrler
Assistant Examiner—Mark Shulman
(74) Attorney, Agent, or Firm—Pillsbury Madison & Sutro LLP

(57) ABSTRACT

The present invention relates to a liner for a refrigerator crisper drawer. The liner comprises a main produce supporting body and provides drawer engaging surfaces. The main body provides a generally upwardly facing produce supporting surface on which items of produce can be placed and has a plurality of openings formed therethrough which enable fluids and air to flow through the main body. The supporting surfaces engage liner supporting surfaces inside the crisper drawer so as to support the items of produce in spaced relation above the floor of the crisper drawer and allow fluids and air to flow along the floor of the drawer beneath the produce supporting body, thereby allowing fluids to drain away from the items of produce through the openings and allowing chilled air within the crisper drawer to flow beneath the items of produce and generally upwardly through the openings to provide circulation to lower portions of the produce. The drawer engaging surfaces are constructed and arranged to enable the liner to be removed from the crisper drawer for cleaning or replacement.

39 Claims, 10 Drawing Sheets

REFRIGERATOR CRISPER DRAWER LINER FOR PREVENTING THE SPOILAGE OF PRODUCE STORED IN A REFRIGERATOR DRAWER

FIELD OF THE INVENTION

The present invention relates to a liner for a refrigerator crisper drawer.

BACKGROUND OF THE INVENTION

Perishable food items, particularly produce items such as fruits and vegetables, are commonly stored in refrigerator crisper drawers to maintain freshness and avoid spoilage. Typically, enough produce to be used over a given period of time, such as a week, is stored in a refrigerator crisper drawer. However, the bottom portions of individual items of produce tend to be compressed against the drawer floor during such storage.

Due to the compression of the produce, the bottom, outermost layers or skin of individual produce items will suffer from trauma resulting in cellular dissolution. Such cellular dissolution is undesirable and can lead to visible blemishes, poor taste, and accelerated spoilage. Furthermore, free flow of refrigerated air, or other chilled fluid, to and about the bottom layers of the produce items is obstructed because of the compressed contact between the produce and the drawer floor. Such free flow of refrigerated air is desirable in order to prevent bacterial growth and spoilage of the produce. Also, when produce is stored directly on the drawer floor, water or liquids oftentimes pool and provide a stagnant, moist environment which encourages bacterial growth, further accelerating spoilage.

Heretofore, it has been known to support food products with a grill-like surface in order to allow liquids to drain away. Examples of such constructions are disclosed in U.S. Pat. Nos. 3,756,681, 3,915,532, and 3,698,783. However, the constructions disclosed in these patents are directed to closed containers rather than to refrigerator crisper drawers and do not provide a suitable solution to the problems outlined above.

Accordingly, there exists a need for a liner for a refrigerator crisper drawer which provides enhanced air flow to the produce stored therein and allows undesirable liquids to drain away from the produce. It is also desirable to do so in such a way that abrasion and trauma to the produce is minimized as the produce is moved about within the drawer.

SUMMARY OF THE INVENTION

It is therefore an object of the present invention to meet the above-described needs. To meet these needs, the present invention provides a removable liner to be used in combination with a refrigerator crisper drawer. The liner comprises a main body and provides a drawer engaging surface. The main body provides a generally upwardly facing produce supporting surface on which items of produce can be placed. The main body also has a plurality of openings formed therethrough which enable fluids, such as moisture, juices, or condensation, to drain away from the items of produce placed on the supporting surface. The engaging surface removably engages a liner supporting surface inside the crisper drawer so as to support the items of produce placed on the produce supporting surface in spaced relation above the drawer floor, thereby allowing the fluid draining away from the items of produce through the openings to drain to the floor and also allowing chilled air within the drawer to flow generally upwardly through the openings to lower portions of the items of produce. The liner may be removed from the drawer for cleaning or replacement when desired.

Preferably, the upwardly facing produce supporting surface is defined by a plurality of smooth, rounded portions. Rounded portions are preferred to minimize both the contact between the liner and the produce and the amount of abrasion to which the produce is subjected. The grill-like surfaces of the aforementioned patents have sharp points or edges which are designed to minimize contact while supporting food items. Such sharp points or edges, however, will abrade or scrape sensitive produce items, such as lettuce, and thus damage them. Rounded portions provide the optimal balance between minimizing both contact and damage.

It has been found that using a liner constructed in accordance with the principles of the present invention functions quite effectively at allowing the circulation of chilled air and the drainage of moisture to and from the produce stored in the refrigerator drawer. In fact, it has been found that using the liner of the present invention reduces degradation of the produce and extends its life.

A further aspect of the present invention provides rolling support structures. These rolling support structures are mounted to the main body for rolling movement and have produce engaging portions which project upwardly from the produce supporting surface to rollingly support the produce items. These rolling structures are particularly advantageous because they allow the produce to be moved easily along the produce supporting surface. This rolling action prevents friction and abrasion of the produce as it is moved within the drawer. This feature is well-suited for home and restaurant applications, wherein produce items are frequently moved around within the drawer during selection. In the preferred embodiments, these rolling structures are generally cylindrical rollers or generally spherical balls.

Other objects, features, and advantages of the present invention will become apparent from the following detailed description, the accompanying drawings, and the appended claims.

DETAILED DESCRIPTION OF THE PREFERRED EMBODIMENTS OF THE INVENTION

Figure 1:
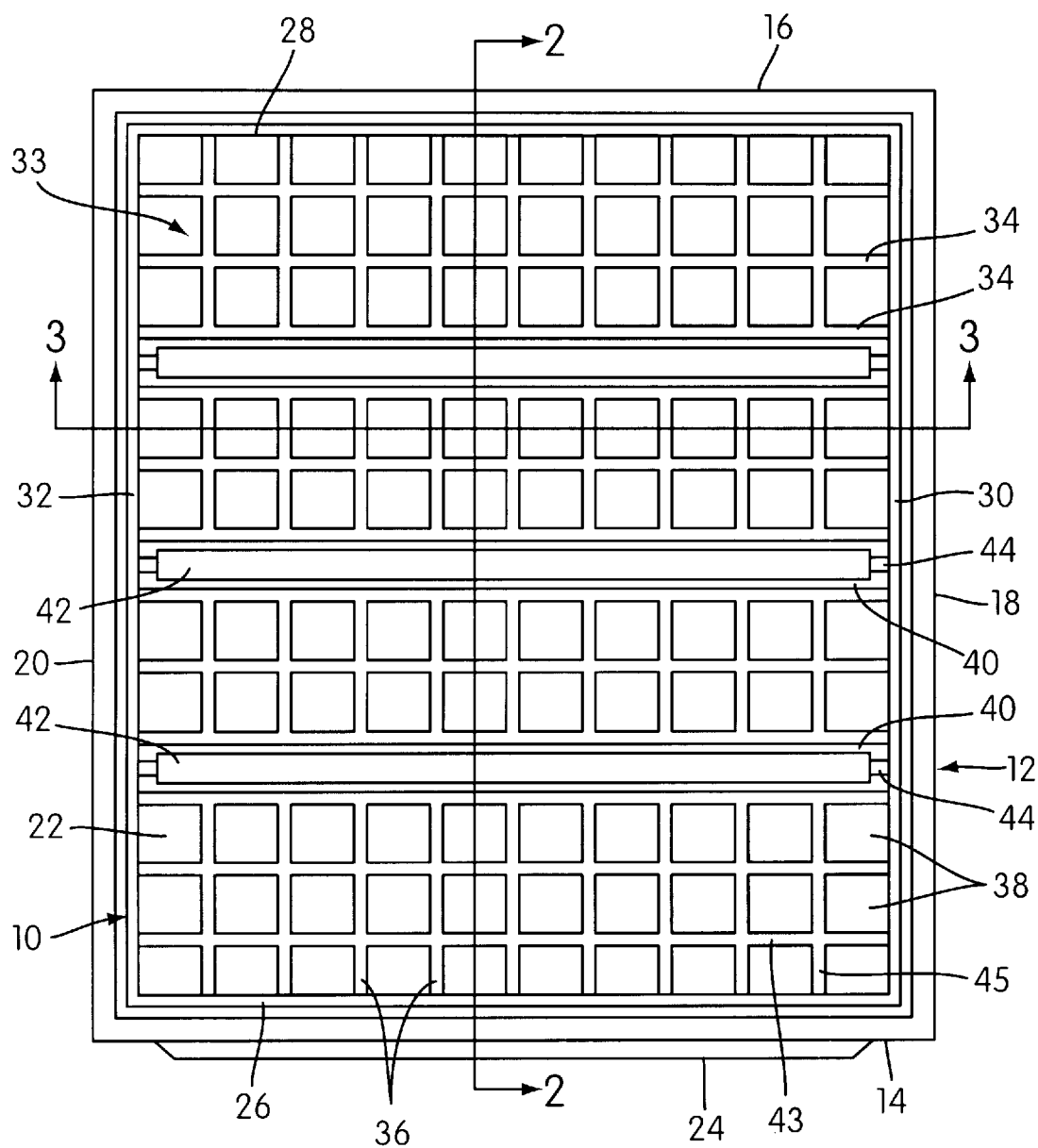
FIG. 1 is a top view of a refrigerator crisper drawer liner embodying the principles of the present invention stored in an operative position inside a refrigerator drawer.

FIG. 1 illustrates a refrigerator crisper drawer liner embodying the principles of the present invention, generally indicated at 10, disposed within the interior of a refrigerator drawer, generally indicated at 12. The refrigerator drawer 12 is of the conventional type commonly used to store produce in refrigerators. The refrigerator drawer 12 has a front wall 14, a back wall 16, a pair of opposing side walls 18, 20, and a floor 22. A handle 24 is mounted on the front wall of the refrigerator drawer 12 to allow a person to manually grasp the handle and slide the drawer 12 in and out of the refrigerator so that produce may be removed from or placed into the refrigerator drawer 12. Also, sliding the drawer 12 out of the refrigerator allows the produced stored therein to be selectively moved about or examined.

The refrigerator crisper drawer liner 10 also has a front wall 26, a back wall 28, a pair of opposing side walls 30, 32, and a main produce supporting body 33. It should be understood that the objects of the present invention may be achieved without providing the front, back and side walls. These walls and the main produce supporting body 33 are joined together and are sized to fit within the interior of the refrigerator drawer 12. Preferably, the liner 10 is injection molded from either a rigid or flexible plastic material. However, the liner 10 may be made of a metal which will not adversely affect the produce or covered with a plastic coating. The main body 33 comprises a plurality of elongated produce supporting structures 34 which extend transversely in a first direction between the pair of opposing side walls 30, 32 of the crisper drawer liner 10. Likewise, a plurality of elongated produce supporting structures 36 extend longitudinally in a second direction between the front and back walls 26, 28 of the crisper drawer liner 10. These transversely extending and longitudinally extending produce supporting structures 34, 36 intersect with each other in a criss-cross manner with the aforesaid first and second directions being generally perpendicular to another to define a generally upwardly facing produce supporting surface with a grid of square or rectangular flow-providing openings or cells 38.

The longitudinally extending produce supporting structures 36 may be interrupted at various points so as to provide transversely extending roller cells 40. These roller cells 40 extend transversely between the side walls 30, 32 and are bounded in the longitudinal direction by a pair of transversely extending produce supporting structures 34 on opposing sides thereof. In the illustrated embodiment three of these transversely extending roller cells are spaced apart in the longitudinal direction of the refrigerator crisper drawer liner 10 with rows of flow-enhancing openings 38 therebetween.

Within each of these transversely extending roller cells 40 is disposed a rolling support structure in the form of a generally cylindrical, transversely extending produce supporting roller 42 rotatably mounted between the side walls 30, 32 of the crisper drawer liner 10. Axle pins 44 or another similar suitable attaching arrangement is used to rotatably mount the produce supporting rollers 42 between the side walls 30, 32 of the drawer liner 10. These pins 44 are inserted into openings in the main body 33 to provide the rotatable support. As can be best seen in FIGS. 2 and 3, upper portions of the transversely extending produce supporting rollers extend above the uppermost surfaces 43, 45 of the produce supporting structures 34, 36 (i.e., above the produce supporting surface). These produce supporting rollers 42 are constructed and arranged to rollingly support produce when it is stored within the refrigerator drawer 12 to thereby prevent abrasion of the produce by the crisper drawer liner 10 as the produce is moved about within the refrigerator drawer 12.

Figure 2:
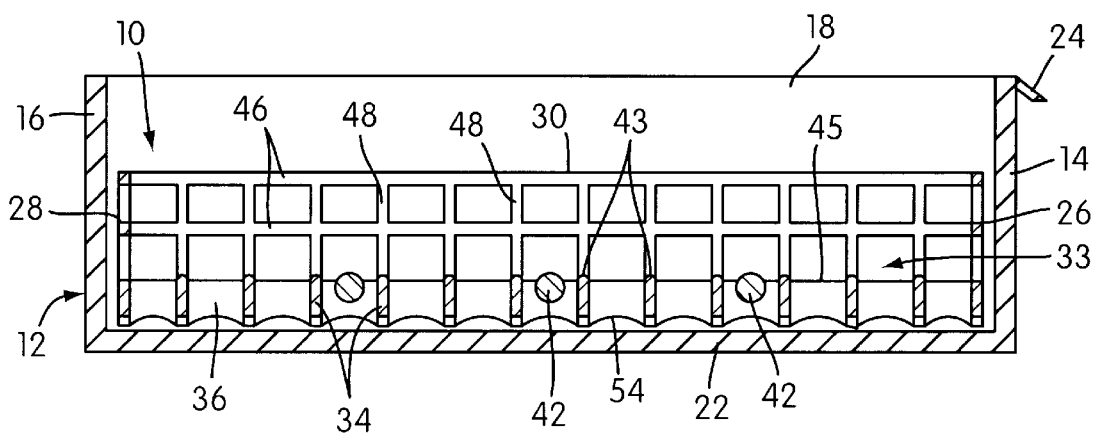
FIG. 2 is a cross-sectional view along lines 2—2 of FIG. 1.
Figure 3:
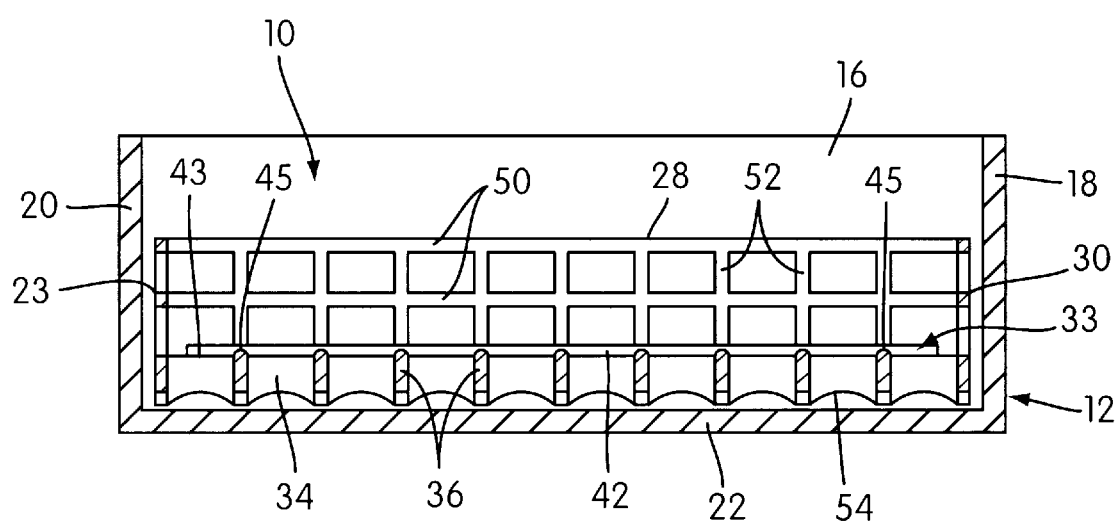
FIG. 3 is a cross-sectional view along lines 3—3 of FIG. 1.

As best seen in FIGS. 2 and 3, the uppermost surfaces 43, 45 of the transversely extending and longitudinally extending produce supporting structures have rounded shapes. The use of rounded shapes is preferable to angular shapes for certain reasons. Angular portions minimize contact between the liner 10 and the produce so as to maximize the flow of chilled air to the lower portions of the produce. Angular portions, however, are sharp and abrade the produce as it is moved about the refrigerator drawer. The preferred rounded shapes of the uppermost surfaces 43, 45 of the produce supporting structures 34, 36 provide an optimal balance between providing a flow of chilled air to the lower portion of the produce and preventing abrasion of the produce. Specifically, the produce supporting structures 34, 36 in combination with the flow-providing openings 38 (1) allow chilled air to flow over the lower portions of the produce stored in the drawer 12 and (2) permit liquid to drain away from the produce. However, the rounded uppermost surfaces 43, 45 of the produce supporting structures 34, 36 will not abrade the produce as it is moved about the drawer 12 because they do not have sharp angular edges.

The produce supporting rollers 42 are preferably used in conjunction with the rounded uppermost surfaces 43, 45 of the produce supporting structures 34, 36. It is to be understood, however, that either the rollers 42 or the rounded shapes of the uppermost surfaces 43, 45 of the produce supporting structures may be used separately in order to minimize abrasion of the produce and maximize air flow to the produce and drainage away therefrom.

As best illustrated in FIG. 2 the side wall 30 of the liner 10 also has a set of horizontally extending structures 46 and a set of vertically extending structures 48 which intersect with one another to a set of openings along the side wall of the crisper drawer liner 10. Likewise, as best seen in FIG. 3, the back wall 28 has a plurality of horizontally extending structures 50 and a plurality of vertically extending structures 52 which intersect with one another to define a plurality of openings on the back wall 28. It can be appreciated that the front wall has a construction similar or identical to the back wall and, likewise, the side wall 32 opposite the side wall 30 has a construction similar or identical to the side wall 30. These openings perform basically the same function as the flow enhancing openings 38 on the floor 33 of the liner 10 and allow chilled air to flow over the produce when it is leaning on the walls of the liner 12.

As is best seen in FIGS. 2 and 3, it is preferable that flow enhancing recesses in the form of arcuate arches 54 are formed in the bottom portions of the longitudinally extending and transversely extending produce supporting structures 34, 36 of the main body 33 of the crisper drawer liner 10. Apertures may be used in place of the recesses/arches. These arcuate arches 54 permit and enhance the flow of chilled air below the produce stored within the refrigerator drawer 12. This flow of chilled air insures that the produce remains chilled, thus inhibiting bacterial growth while minimizing produce weepage, condensation and other fluid build-up from forming below or on the produce and accelerating spoilage and bacterial proliferation. Also, these arches 54 allow liquid to flow along the floor of the drawer 12 between the produce supporting structures 34,36 in a relatively uninhibited manner while permitting the free flow of chilled air to flow and evenly distribute about the bottoms of the produce items.

It can be seen that the crisper drawer liner 10 of the present invention provides many advantages. It reduces spoilage of produce stored therein by allowing fluids to drain away from the produce and enhancing the flow of chilled air thereto. It also minimizes the abrading effect which can occur when the produce is moved about the drawer 12, as is often the case in family homes where many people will rummage through the drawer 12 to find a particular item of produce. Additionally, the crisper drawer liner 10 of the present invention is easy to clean because it can simply be removed from the drawer 12 and rinsed under warm water. Furthermore, the need for such cleaning will be reduced because fresh produce does not create as much liquid and debris as spoiled produce. Thus, not only is cleaning easier, the need for cleaning occurs less often because spoilage of the produce is prevented. In addition, the absence of spoilage prevents such spoilage from the contaminating the portions of the produce that it otherwise woul contact.

Figure 4:
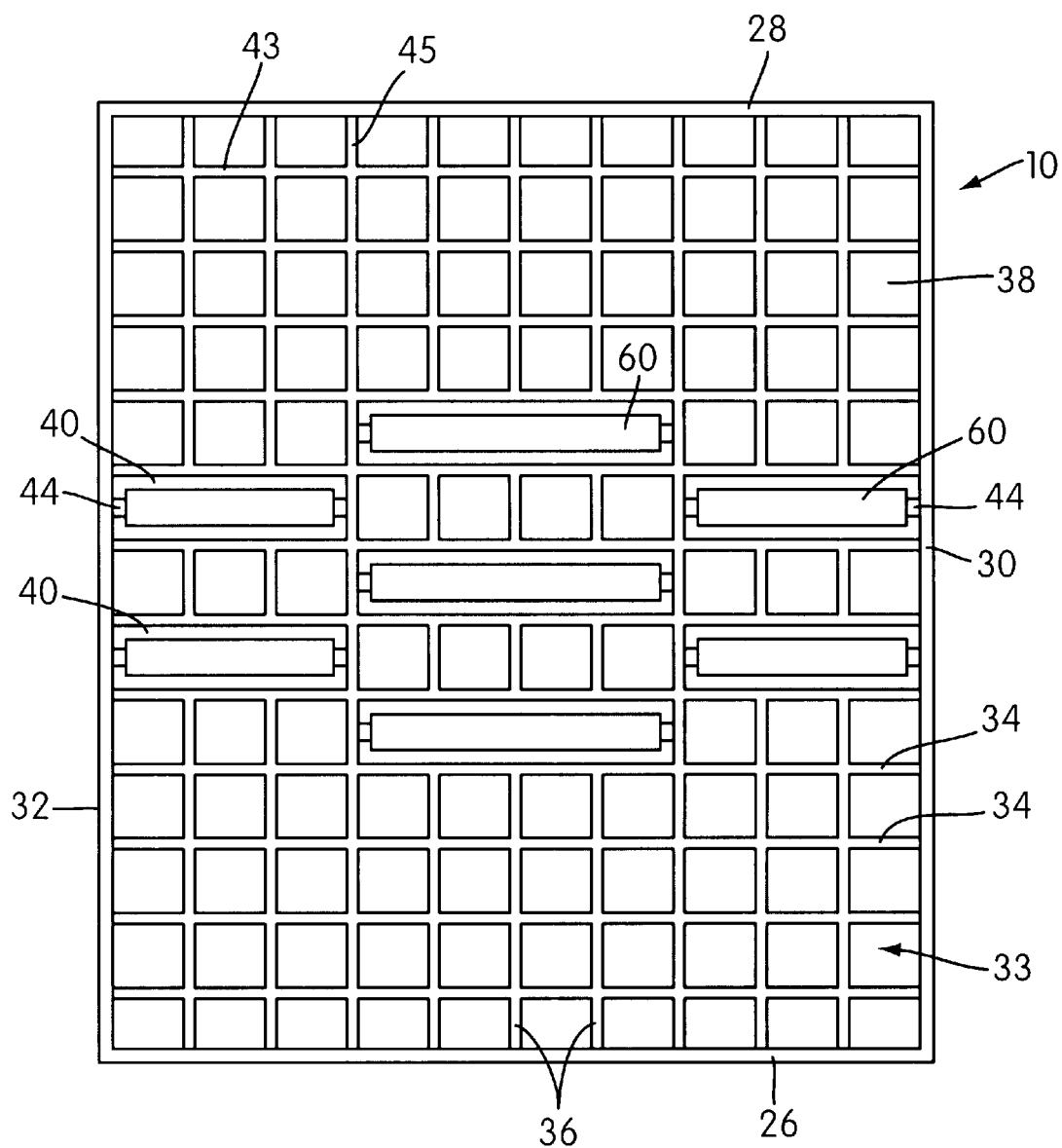
FIG. 4 is a top view of a second embodiment of a refrigerator crisper drawer liner embodying the principles of the present invention.

FIG. 4 illustrates an alternative embodiment of the crisper drawer liner illustrated in FIG. 1. The construction of the crisper drawer liner of FIG. 4 is similar to the crisper drawer liner of FIG. 1. Thus, the same reference numerals will be used to denote similar structures. As can be seen by comparing FIG. 4 to FIG. 1, the embodiment of FIG. 4 uses produce supporting rollers 60 which are rotatably mounted on axle pins 44 and extend transversely between two longitudinally extending produce supporting structures 36, rather than between the side walls 30, 32. The produce supporting rollers 60 are placed strategically along the produce supporting body 33 at locations where the most items of produce will commonly be located, i.e., the center of the liner 12. It is to be understood, however, that any arrangement of produce supporting rollers 60 may be utilized within the broadest concepts of the present invention.

Figure 5:
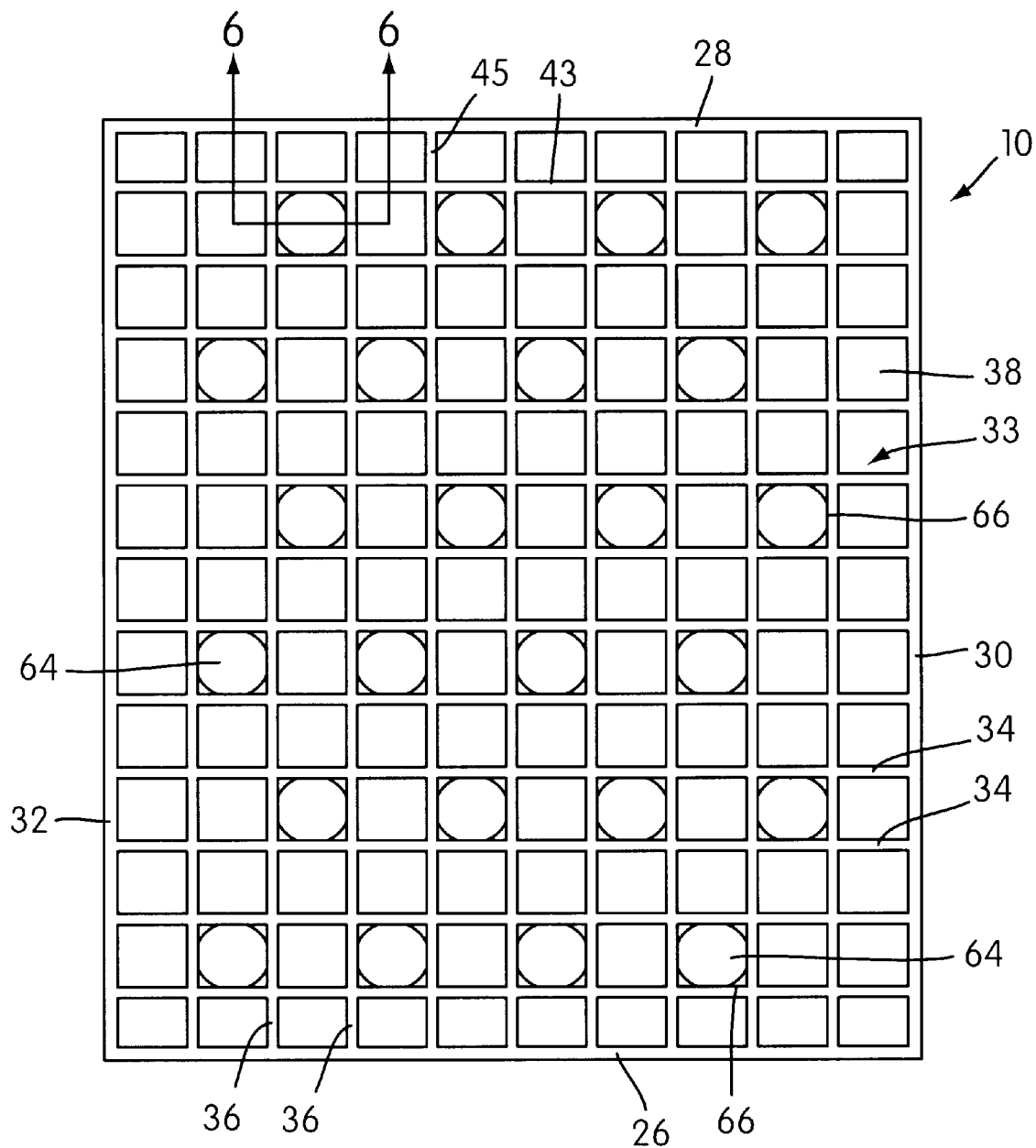
FIG. 5 is a top view of a third embodiment of a refrigerator crisper drawer liner embodying the principles of the present invention.

FIG. 5 illustrates a third embodiment of the present invention. As before, the same reference numerals will be used to denote structures similar to structures found in the previous embodiments. In this third embodiment, rolling support structures in the form of generally spherical produce supporting members 64 are used in place of the produce supporting rollers 42, 60 of the above-described embodiments to rollingly support produce stored within the refrigerator drawer 12. It is to be understood that ovoid rollers mounted in individual cells 38 may be used in place of the spherical members 64. Like the supporting rollers of the above embodiments, the spherical members 64 illustrated in FIG. 5 function to rollingly support produce and minimize abrasion damage to the outer surface or skin of the produce. The main body 33 of the liner 10 of this embodiment has a similar construction to that of the above-described embodiments in order to allow liquids and moisture to drain away from the produce and to enhance the flow of chilled air along the lower portions of the produce.

Figure 6:
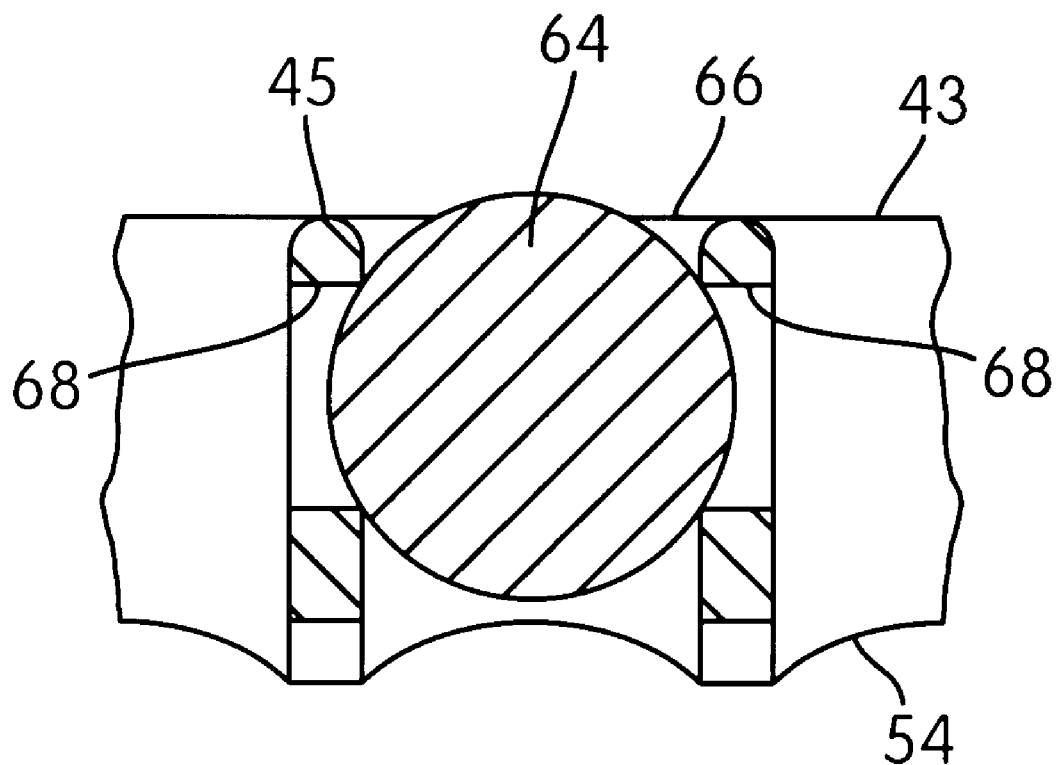
FIG. 6 is a cross-sectional view along lines 6—6 of FIG. 5.

FIG. 6 illustrates a cross-section of an individual sphere retaining opening 66 with a spherical produce supporting member 64 mounted therein. Arches 54 are still preferably used in this third embodiment to provide an increased flow of chilled air below the produce. Sphere retaining structure in the form of sphere retaining openings 68 are formed in two defining the walls of the sphere retaining opening 66. These openings may be formed in all four walls of the opening 66. These sphere retaining openings 68 allow the produce supporting sphere 44 to be simply snap-fit into the sphere retaining opening 66 by simply pressing the sphere 64 downwardly therein.

It is contemplated as part of the present invention that all of the individual cells 38 may have such sphere retaining openings 68 formed in the walls thereof. In such a case, any cell 38 could function as a sphere retaining cell 66, thereby allowing any number of produce supporting spheres 64 to be arranged in a desirable pattern along the main body 33 of the liner 10. It should also be understood that the spheres 64 may be mounted in their respective sphere retaining openings 66 on individual axles. However, this construction is more complex and the use of sphere retaining openings 68 is preferred in view of simplicity and reduced cost. Likewise, the produce supporting rollers 42, 60 described in the first two embodiments may be mounted in a manner similar to the spheres 64 of the embodiment illustrated in FIGS. 5–6. Specifically, the ends of the produce supporting rollers 42, 60 can be rounded so as to snap-fit into roller retaining openings (not shown) having a construction similar to the sphere retaining openings 68 shown in FIG. 6.

Figure 7:
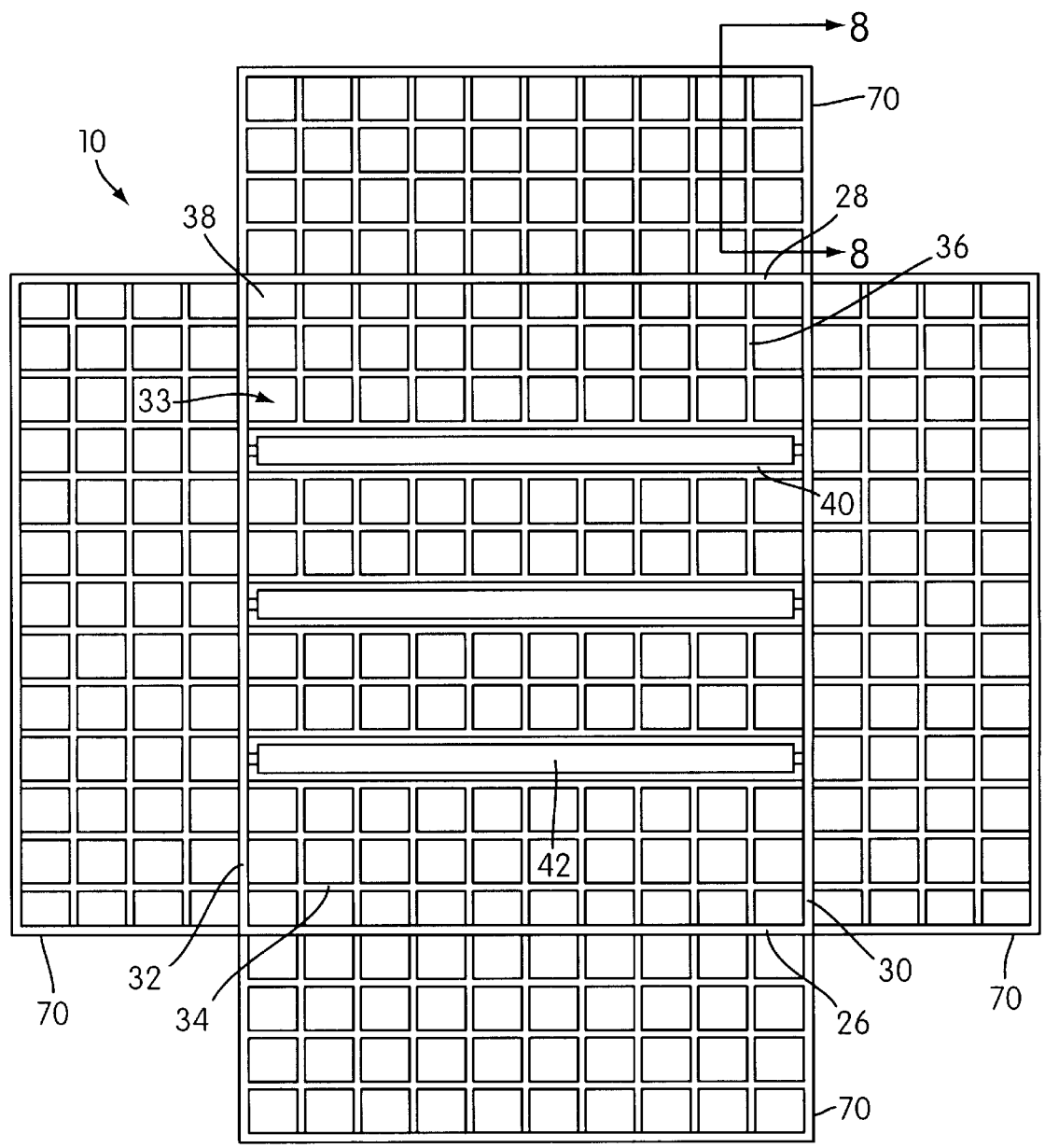
FIG. 7 is a top view of a fourth embodiment of a refrigerator crisper drawer liner embodying the principles of the present invention.

FIG. 7 illustrates another embodiment of the present invention. As before, the same reference numerals will be used to denote structures similar to those in the previous embodiments. Although FIG. 7 illustrates a main body 33 having transversely extending rollers 42 mounted therein similar to the embodiment illustrated in FIG. 1, the produce supporting rollers 60 of FIG. 4 or the produce supporting spheres 64 of FIGS. 5–6 may be interchangeably used in place of the transversely extending produce supporting rollers 42. The liner 10 of FIG. 7 includes flexible extensions 70 extending outwardly from the main body 33 thereof.

Figure 8:
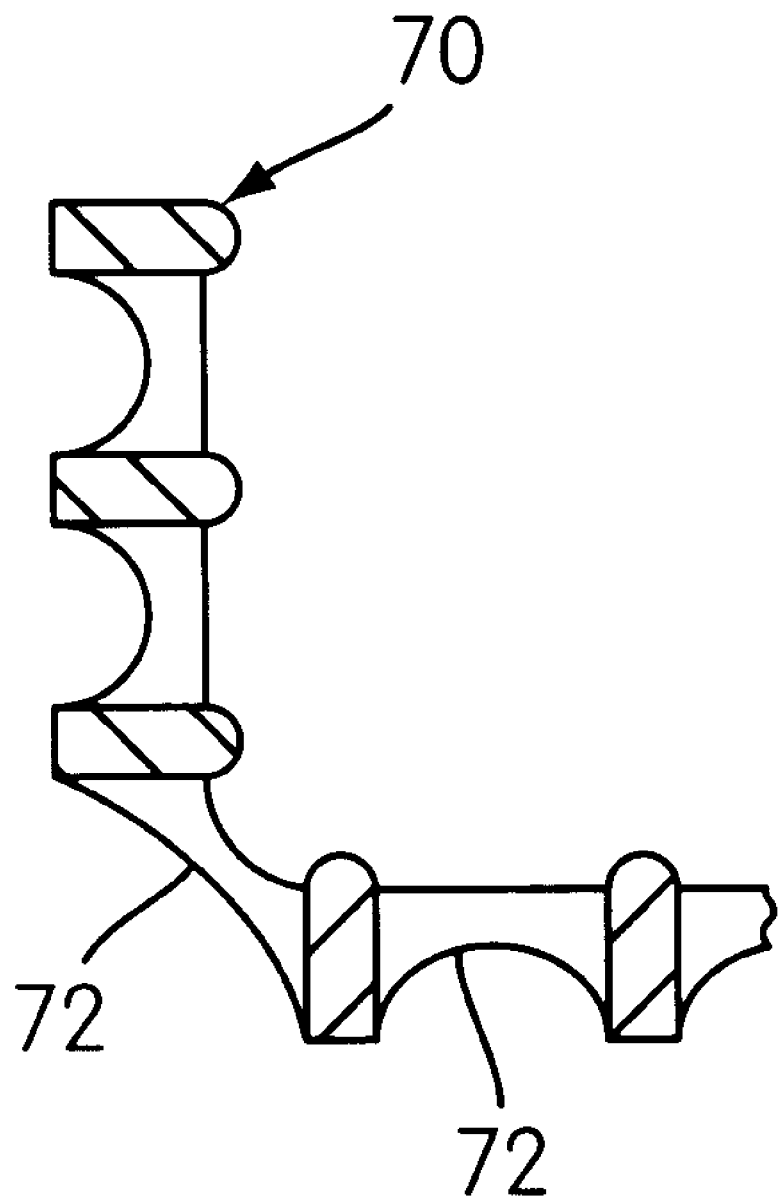
FIG. 8 is a cross-sectional view along lines 8—8 of FIG. 7.

As can be best seen in FIG. 8, the arches 72 formed in the bottom of the flexible extensions 70 allow for bending. The extensions 70 can be bent along any one of the sets of arches 72 in order to fit into refrigerator drawers of various sizes. These arches 72 also serve to enhance the flow of chilled air to the produce stored in the liner 10. These arches 72 are not necessary to accomplish the bending of the flexible extensions 70, although they are preferable in view of their flow enhancing capabilities. Instead of using the arches, the flexible extensions 70 may be made of a highly flexible plastic in order to fit into drawers of various sizes.

Figure 9:
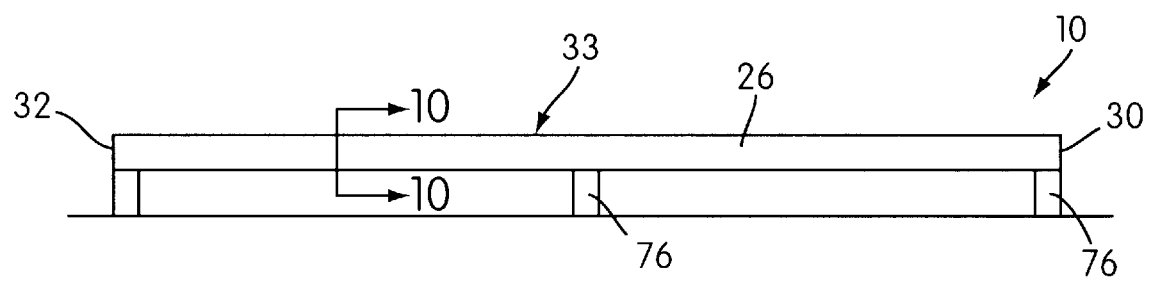
FIG. 9 is a front view of a fifth embodiment of a crisper drawer liner embodying the principles of the present invention.
Figure 10:
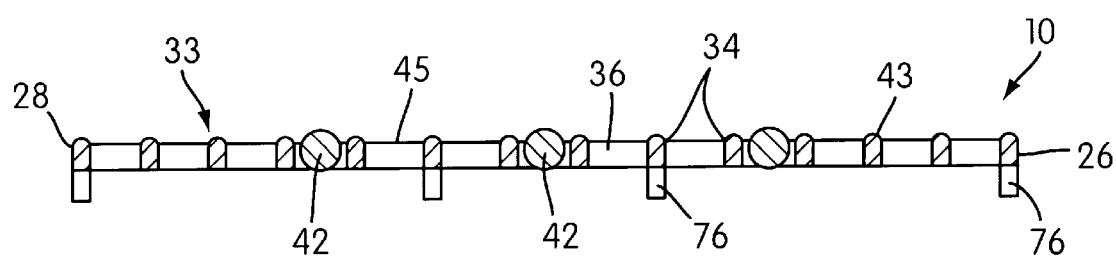
FIG. 10 is a cross-sectional view along lines 10—10 of FIG. 9.

FIG. 9 illustrates a fifth embodiment of the present invention. As before, the same reference numerals will be used to denote structures corresponding to similar structures in the previous embodiments. According to this fifth embodiment, the crisper drawer liner 10 comprises a main body 33 supported by a plurality of supporting legs 76. The main body 33 may be of any construction set forth in any of the previous embodiments. In the illustrated embodiment, the main body 33 has a construction similar to that illustrated in FIG. 1. As can be seen in FIG. 10, no arches are present in the transversely or longitudinally extending produce supporting structures 34, 36. Instead, airflow through the flow-providing cells 38 is enhanced by elevating the main body 33 above the refrigerator drawer floor on a set of legs 76 to thereby permit a free flow of chilled air below the liner 10. The bottom surfaces of these legs provide the downwardly facing engaging surfaces of the liner 10, which engage upwardly facing surfaces provided by the floor of the drawer. Undesirable fluids and moisture on the produce are permitted to drain through the flow providing openings 38 directly to the drawer floor 12, thereby preventing them from pooling around the produce and accelerating spoilage.

It will be realized that the foregoing preferred embodiments of the present invention have been shown and described in detail for the purpose of illustrating the functional and structural principles of the present invention and are subject to changes and modifications without departure from such principles. Therefore, the present invention includes all modifications, alterations, and substitutions encompassed within the spirit and scope of the appended claims.

What is claimed:

1. A combination comprising:
   a refrigerator in which chilled air is circulated;
   a refrigerator crisper drawer disposed within said refrigerator, said crisper drawer comprising a generally upwardly facing floor and a peripheral wall extending generally upwardly from said floor, said chilled air of said refrigerator being circulated within said crisper drawer; and
   a removable crisper drawer liner comprising:
      a main produce supporting body providing a generally upwardly facing produce supporting surface on which items of produce can be placed, said main body having a plurality of openings formed therethrough that enable fluids and air to flow through said main body;
      said liner providing drawer engaging surfaces removably engaged with liner supporting surfaces provided inside the refrigerator crisper drawer so as to support the items of produce placed on said produce supporting surface in spaced relation above the floor of the crisper drawer and to allow fluids and air to flow along the floor of said drawer beneath said produce supporting body, thereby allowing fluids to drain away from the items of produce supported on said produce supporting surface through said openings and allowing said chilled air circulated within said crisper drawer to flow beneath the items of produce and generally upwardly through said openings to provide air circulation to lower portions of the items of produce;
      said drawer engaging surfaces being constructed and arranged to enable said liner to be removed from said crisper drawer for cleaning or replacement.

2. The combination of claim 1, wherein said main produce supporting body comprises a plurality of first elongated produce supporting structures extending generally parallel to one another in a first direction and a plurality of second elongated produce supporting structures extending generally parallel to one another in a second direction which extends generally perpendicularly to said first direction.

3. The combination of claim 2, wherein said first and second elongated produce supporting structures have rounded upper portions which cooperate to provide said produce supporting surface.

4. The combination of claim 2, wherein said first and second elongated produce supporting structures are integrally molded together.

5. The combination of claim 2, wherein said liner supporting surfaces provided inside said crisper drawer are generally upwardly facing and provided by the floor thereof, and wherein said drawer engaging surfaces are generally downwardly facing and provided by lowermost edges of said first and second produce supporting structures,
   said first and second elongated produce supporting structures having recesses formed therein from the lowermost edges thereof, said recesses being positioned and configured to allow both liquid on the floor of the crisper drawer and chilled air flowing along the floor of the crisper drawer to flow through said first and second elongated produce supporting structures.

6. The combination of claim 5, wherein the recesses in said first and second elongated produce supporting structures are arcuate.

7. The combination of claim 1, wherein said liner supporting surfaces inside said crisper drawer are generally upwardly facing and provided by the floor thereof and wherein said drawer engaging surfaces are generally downwardly facing,
   said liner further comprising a plurality of legs which depend downwardly from said main body and provide said downwardly facing drawer engaging surfaces, said legs being constructed and arranged to support said main produce supporting body in spaced relation above the floor of said drawer.

8. The combination of claim 7, wherein said legs are integrally molded with said main body.

9. The combination of claim 2, wherein said liner supporting surfaces inside said crisper drawer are generally upwardly facing and provided by the floor thereof and wherein said drawer engaging surfaces are generally downwardly facing,
   said liner further comprising a plurality of legs which depend downwardly from said main body and provide said downwardly facing drawer engaging surfaces, said legs being constructed and arranged to support said main produce supporting body in spaced relation above the floor of said drawer.

10. The combination of claim 9, wherein said legs are integrally molded with said main body.

11. The combination of claim 1, wherein said main body is generally rectangular and wherein the interior of said crisper drawer is generally rectangular.

12. The combination of claim 1, wherein said liner has a peripheral wall extending upwardly from said main body.

13. The combination of claim 12, wherein said peripheral wall has openings formed therethrough to allow for the flow of chilled air and liquids through said peripheral wall.

14. The combination of claim 12, wherein said peripheral wall is molded integrally with said main body.

15. The combination of claim 1, wherein said removable liner is injection molded as one piece.

16. In combination with a refrigerator crisper drawer comprising a generally upwardly facing floor and a peripheral wall extending generally upwardly from said floor, a removable crisper drawer liner comprising:
   a main produce supporting body providing a generally upwardly facing produce supporting surface on which items of produce can be placed, said main body having a plurality of openings formed therethrough that enable fluids and air to flow through said main body;
   said liner providing drawer engaging surfaces removably engaged with liner supporting surfaces provided inside the refrigerator crisper drawer so as to support the items of produce placed on said produce supporting surface in spaced relation above the floor of the crisper drawer and to allow fluids and air to flow along the floor of said drawer beneath said produce supporting body, thereby allowing fluids to drain away from the items of produce supported on said produce supporting surface through said openings and allowing chilled air within said crisper drawer to flow beneath the items of produce and generally upwardly through said openings to provide air circulation to lower portions of the items of produce;
   said drawer engaging surfaces being constructed and arranged to enable said liner to be removed from said crisper drawer for cleaning or replacement;

wherein said liner further comprises a plurality of rolling support structures mounted to said main body for rolling movement, said rolling structures having produce engaging portions which project upwardly above the produce supporting surface of said main body such that said rolling support structures rollingly support the produce placed on the produce supporting surface of said main body.

17. The combination of claim 16, wherein said rolling structures comprise generally cylindrical rollers rotatably mounted to said main body.

18. The combination of claim 17, wherein said main body has pin receiving openings and wherein said generally cylindrical rollers have axle pins on opposing ends thereof, said axle pins being received within said pin receiving openings to rotatably mount said rollers.

19. The combination of claim 16, wherein said rolling structures comprise generally spherical members mounted for rotation on said main body.

20. The combination of claim 16, wherein said main produce supporting body comprises a plurality of first elongated produce supporting strictures extending generally parallel to one another in a first direction and a plurality of second elongated produce supporting structures extending generally parallel to one another in a second direction which extends generally perpendicularly to said first direction.

21. The combination of claim 20, wherein said first and second elongated produce supporting structures have rounded upper portions which cooperate to provide said produce supporting surface.

22. The combination of claim 20, wherein said first and second elongated produce supporting structures are integrally molded together.

23. The combination of claim 20, wherein said liner supporting surfaces inside said crisper drawer are generally upwardly facing and provide by the floor thereof, and wherein said drawer engaging surfaces are generally downwardly facing and provided by lowermost edges of said first and second produce supporting structures, said first and second elongated produce supporting structures having recesses formed therein from the lowermost edges thereof, said recesses being positioned and configured to allow both liquid on the floor of the crisper drawer and chilled air flowing along the floor of the crisper drawer to flow through said first and second elongated produce supporting structures.

24. The combination of claim 23, wherein the recesses in said first and second elongated produce supporting structures are arcuate.

25. The combination of claim 16, wherein said liner supporting surfaces inside said crisper drawer are generally upwardly facing and provided by the floor thereof and wherein said drawer engaging surfaces of said liner are generally downwardly facing, said liner further comprising a plurality of legs which depend downwardly from said main body and provide said downwardly facing drawer engaging surfaces, said legs being constructed and arranged to support said main produce supporting body in spaced relation above the floor of said drawer.

26. The combination of claim 25, wherein said legs are integrally molded with said main body.

27. The combination of claim 20, wherein said liner supporting surface inside said crisper drawer are generally upwardly facing and provided by the floor thereof and wherein said drawer engaging surfaces of said liner are generally downwardly facing, said liner further comprising a plurality of legs which depend downwardly from said main body and provide said downwardly facing supporting surfaces, said legs being constructed and arranged to support said main produce supporting body in spaced relation above the floor of said drawer.

28. The combination of claim 20, wherein said legs are integrally molded with said main body.

29. The combination of claim 16, wherein said main body is generally rectangular and wherein the interior of said crisper drawer is generally rectangular.

30. The combination of claim 16, wherein said liner has a peripheral wall extending upwardly from said main body.

31. The combination of claim 30, wherein said peripheral wall has openings formed therethrough to allow for the flow of chilled air and liquids through said peripheral wall.

32. The combination of claim 30, wherein said peripheral wall is molded integrally with said main body.

33. The combination of claim 16, wherein said produce supporting surface is defined by a plurality of rounded produce supporting portions.

34. The combination of claim 16, wherein said produce supporting surface is defined by a plurality of rounded produce supporting portions.

35. A method for storing produce, comprising, providing a crisper drawer liner comprising a main produce supporting body, said produce supporting body providing a produce supporting surface and a plurality of openings extending through said body;

removably disposing said liner inside a refrigerator crisper drawer such that said produce supporting surface of said body faces generally upwardly with respect to said drawer, said drawer being located within a refrigerator wherein chilled air is circulated;

placing items of produce inside said drawer on said produce supporting surface such that said liner supports said produce items in spaced relation above the floor of said drawer, thereby allowing fluids to drain away from said items of produce through said openings and allowing chilled air within said crisper drawer to flow beneath the items of produce and generally upwardly through said openings to provide air circulation to lower portions of the items of produce.

36. The method of claim 35, wherein said main produce body comprises a plurality of first elongated produce supporting structures extending generally parallel to one another in a first direction and a plurality of second elongated produce supporting structures extending generally parallel to one another in a second direction which extends generally perpendicularly to said first direction.

37. In combination with a refrigerator crisper drawer comprising a generally upwardly facing floor and a peripheral wall extending generally upwardly from said floor, a removable crisper drawer liner comprising:

a main produce supporting body providing a generally upwardly facing produce supporting surface on which items of produce can be placed, said main body having a plurality of openings formed therethrough that enable fluids and air to flow through said main body;

said liner providing drawer engaging surfaces removably engaged with liner supporting surfaces provided inside the refrigerator crisper drawer so as to support the items of produce placed on said produce supporting surface in spaced relation above the floor of the crisper drawer and to allow fluids and air to flow along the floor of said drawer beneath said produce supporting body, thereby allowing fluids to drain away from the items of produce supported on said produce supporting surface through said openings and allowing chilled air within said crisper drawer to flow beneath the items of produce and generally upwardly through said openings to provide air circulation to lower portions of the items of produce;

said drawer engaging surfaces being constructed and arranged to enable said liner to be removed from said crisper drawer for cleaning or replacement;

wherein said liner supporting surfaces inside said crisper drawer are generally upwardly facing and provided by the floor thereof and wherein said drawer engaging surfaces of said liner are generally downwardly facing, said liner further comprising a plurality of legs which depend downwardly from said main body and provide said downwardly facing drawer engaging surfaces, said legs being constructed and arranged to support said main produce supporting body in spaced relation above the floor of said drawer;

wherein said legs are integrally molded with said main body.

38. In combination with a refrigerator crisper drawer comprising a generally upwardly facing floor and a peripheral wall extending generally upwardly from said floor, a removable crisper drawer liner comprising:

a main produce supporting body providing a generally upwardly facing produce supporting surface on which items of produce can be placed, said main body having a plurality of openings formed therethrough that enable fluids and air to flow through said main body;

said liner providing drawer engaging surfaces removably engaged with liner supporting surfaces provided inside the refrigerator crisper drawer so as to support the items of produce placed on said produce supporting surface in spaced relation above the floor of the crisper drawer and to allow fluids and air to flow along the floor of said drawer beneath said produce supporting body, thereby allowing fluids to drain away from the items of produce supported on said produce supporting surface through said openings and allowing chilled air within said crisper drawer to flow beneath the items of produce and generally upwardly through said openings to provide air circulation to lower portions of the items of produce;

said drawer engaging surfaces being constructed and arranged to enable said liner to be removed from said crisper drawer for cleaning or replacement;

wherein said main produce supporting body comprises a plurality of first elongated produce supporting structures extending generally parallel to one another in a first direction and a plurality of second elongated produce supporting structures extending generally parallel to one another in a second direction which extends generally perpendicularly to said first direction, wherein said liner supporting surfaces inside said crisper drawer are generally upwardly facing and provided by the floor thereof and wherein said drawer engaging surfaces of said liner are generally downwardly facing, said liner further comprising a plurality of legs which depend downwardly from said main body and provide said downwardly facing drawer engaging surfaces, said legs being constructed and arranged to support said main produce supporting body in spaced relation above the floor of said drawer.

39. The combination of claim 38, wherein said legs are integrally molded with said main body.

* * * * *

UNITED STATES PATENT AND TRADEMARK OFFICE
CERTIFICATE OF CORRECTION

PATENT NO. : 6,173,580
DATED : January 16, 2001
INVENTOR(S) : Max Rosenberg

It is certified that error appears in the above-identified patent and that said Letters Patent is hereby corrected as shown below:

On the Cover Sheet:

(76) Inventor: This should read as follows:

--Max Rosenberg, 4224 Houma Blvd., Suite 548, Metairie, LA (US) 70005--

Please insert:

--Related U.S. Application Data

(60) Provisional application No. 60/082,942, filed on Apr. 24, 1998.--

Column 1, Line 5:

Please insert:

The present application claims priority to U. S. Provisional Appln. No. 60/082,942, filed April 24, 1998.--

Signed and Sealed this

Eighth Day of May, 2001

*Attest:*

NICHOLAS P. GODICI

*Attesting Officer*   *Acting Director of the United States Patent and Trademark Office*